United States Patent [19]

Weeren et al.

[11] Patent Number: 5,913,195

[45] Date of Patent: Jun. 15, 1999

[54] SYSTEM AND METHOD FOR DEVELOPING VRU VOICE DIALOGUE

[75] Inventors: Eric Weeren, Carrollton; Myra Hambleton, Plano, both of Tex.

[73] Assignee: InterVoice Limited Partnership, Reno, Nev.

[21] Appl. No.: 08/774,234

[22] Filed: Dec. 27, 1996

[51] Int. Cl.[6] ....................................................... G10L 9/00

[52] U.S. Cl. .......................... 704/270; 395/701; 395/702; 707/200; 707/201

[58] Field of Search ..................................... 395/671, 701, 395/702, 703, 680, 682; 345/333–335, 348–349, 967; 379/112, 67, 114, 88; 707/200; 704/270

[56] References Cited

U.S. PATENT DOCUMENTS

| | | | |
|---|---|---|---|
| 4,797,911 | 1/1989 | Szlam et al. | 379/67 |
| 5,131,027 | 7/1992 | Hird et al. | 379/112 |
| 5,146,491 | 9/1992 | Silver et al. | 379/114 |
| 5,355,406 | 10/1994 | Chencinski et al. | 379/88 |
| 5,367,609 | 11/1994 | Hopper et al. | 395/2.87 |
| 5,428,782 | 6/1995 | White | 395/650 |
| 5,448,740 | 9/1995 | Kiri et al. | 395/700 |
| 5,475,792 | 12/1995 | Stanford et al. | 395/2.42 |
| 5,485,615 | 1/1996 | Wennmyr | 395/700 |
| 5,572,727 | 11/1996 | Larsson et al. | 395/616 |

OTHER PUBLICATIONS

Intervoice, RobotOperator System Product Description Manual, Doc.No.60.00.29, Jun. 15, 1994, pp. 1–66.

McIntyre et al., ("Visual tools for generating iconic programming environments", Visual Languages, 1992, IEEE Workshop, Jan. 1992, pp.162–168).

Elsevier Advanced Technology Publications, ("NATWEST launches telephone banking pilot scheme", Electronic Banking and Finance, Aug. 1988, V.5, No.6).

*Primary Examiner*—David R. Hudspeth
*Assistant Examiner*—Vijay B. Chawan
*Attorney, Agent, or Firm*—Fulbright & Jaworski L.L.P.

[57] ABSTRACT

A system and method for developing a VRU program accomplished in two parts is disclosed. A prototype of the customer's desired conversation is created which is a summary of the customer's VRU requirements. This summary is used to verify customer satisfaction with the verbal conversations as well as the sufficiency of information for host interaction prior to any actual VRU programming being commenced. Thereafter, a framework of the VRU program to be completed as a functioning program by the developer may be generated from this summary. Links are maintained between the summary and a VRU program created through use of the framework to aid in development and maintaining synchronization between the VRU program and the summary. The linked summary and program provide easier modification as changes by the customer with only reference to the summary may be easily incorporated into the linked program.

50 Claims, 3 Drawing Sheets

SYSTEM AND METHOD FOR DEVELOPING VRU VOICE DIALOGUE

RELATED APPLICATIONS

Reference is hereby made to the following co-pending and commonly assigned U.S. patent application: ENHANCED GRAPHICAL DEVELOPMENT ENVIRONMENT FOR CONTROLLING PROGRAM FLOW, Ser. No. 08/599,134, the disclosure of which application is incorporated herein by reference.

TECHNICAL FIELD OF THE INVENTION

This invention relates in general to development of a voice response unit (VRU) voice dialogue and more particularly to an improved system and method for developing call flow of a VRU program by the creation of a call flow summary capable of presenting the dialogue in an audible format early in the application specification process.

BACKGROUND OF THE INVENTION

It is common today for a business or similar entity to utilize a voice response unit (VRU) in conjunction with a communication system and host information processor system in order to automate responses to client requests for services or information. Typically, a VRU is implemented at a business location as a subsystem interacting with the business' telephone communication system, such as a private branch exchange (PBX), and data processing system.

The VRU subsystem itself is a processor-based system requiring an operating algorithm in order to interact with the PBX and data processing host such as a LAN, according to the entity's desires in response to their client's inputs. This algorithm is a complex set of instructions including: menu hierarchies including lists of options and their related functions; static messages to be used alone or in conjunction with spoken variables; and host interaction instructions to retrieve and store variables and information.

It is the development of this complex set of instructions wherein a problem common in the art today lies. In order to create an algorithm capable of accomplishing the automation of responses desired by an entity in response to inputs by their clients, very detailed information must be gathered from the entity. This information includes specific verbiage to be spoken to prompt for input as well as to present requested information. Additionally, details as to the call flow, or what information should be presented at what point in the conversation are necessary. Call flow information includes considerations such as at what point the conversation should branch in response to client input/request. Moreover, if client requested information is to be presented in the call flow, consideration must be given to the point at which any information required for retrieval or authorization of the information is to be provided.

Presently, this information is gathered by a VRU vendor/supplier by putting a specification writer in contact with the entity desirous of a VRU application. Because of the nature of the VRU, this process of gathering information typically encompasses many aspects of an entity. Therefore, multiple representatives of the entity are often required to provide input in the VRU specification process, adding to the complexity of the specification process. The entity's representatives contributing to the specification may include representatives of such areas as sales/marketing, management information systems (MIS), legal, and quality assurance (QA).

The specification created from the interview process is generally a very thick textual document that is necessarily very technical as it is to be utilized by the programmers who will actually be developing the VRU algorithm according to the needs of the entity. Its contents include all the information necessary to implement the desired VRU. Specified in the document is the interaction with the caller, all the different branches that the VRU script can take, all the error processing, all of the host processor interactions and/or database interactions required as well as most of the calculations required to present the desired information.

The specification is presented in a format of pseudo programming code which includes reference to variables and jumps to various pages of the document corresponding with branching of the call flow. This format provides a very detailed representation of the VRU application, but such complexity necessarily creates a cryptic and difficult to comprehend representation, especially for those not experienced in reviewing such information. Although cryptic, this information is a precise blueprint from which the programmer will program the VRU.

The entity desirous of the VRU application must agree that the product specified in the specification is indeed the product they desire. However, because of the specification's very technical and cryptic nature, it is seldom readily apparent that the product detailed in the specification is indeed what the client desires. For example, there is no general overview of the VRU application that may be had to better understand the call flow possibilities supported by the VRU application.

To complicate the matter further, typically the lengthy specification must be reviewed by several representatives of the entity, each with an eye toward a different aspect of the specification. For example, a product manager may review the specification to verify that information concerning the entity's products are presented in a meaningful format. Likewise, a MIS manager may review the specification to verify that all information required to retrieve a piece of information from one of his/her systems is gathered by the VRU prior to the point at which it requests information from the host processor. Similarly, a review of the actual verbiage to be spoken may be required of the public relations and/or legal department. Those reviewing the specification shall be referred to hereinafter as "consumers" of the specification. Other consumers may also be required to review the specification, either in whole or in part, such as a project manager, company president, or telephony expert.

The vendor/supplier of the VRU application may also have consumers of the specification. These consumers may include application programmers, application QA personnel, modifications programmers, and project manager.

Although all of the specific information necessary to implement the VRU algorithm is contained within the prior art specification, it is typically inter-mingled with various other information contained within the specification. There is no navigation means by which a consumer may easily identify areas of the document or VRU application in which he/she is interested. Therefore, each consumer, whether interested in the entire document or only in particular information contained therein, must review the entire specification. This can cause the consumer to inadequately review the specification because of an inability to wade through the entire document to obtain a good understanding of particular information they are concerned with. This problem is compounded by difficulty in understanding what is presented because of the specification's highly technical and cryptic nature.

Furthermore, a review of the verbiage of the VRU dialogue in text form, as presented in the specification, does not give the consumer an accurate impression of the actual dialogue that will result. There is a great deal of difference between reading words on a piece of paper and hearing them. Specifically, the pace is much different between the spoken dialogue and the dialogue as read. This difference is compounded by the format of the specification necessitating leafing through pages at every branch of the dialogue.

Therefore, the use of the prior art specification can result in the necessity for modification of a completed algorithm created from the specification even after a review by representatives of the entity utilizing the VRU. Such modification is necessitated by undesirable aspects of the VRU not being recognized as they appeared in the specification document.

Additionally, the complexity of the specification causes revisory iterations to take a considerable amount of time. Not only does the initial creation of such a detailed document require a significant amount of time after the initial specification interview, but once the entity has been given the document it takes a considerable amount of time for their representatives to review and absorb it. Thus, there is a long delay in terms of real time spent before a vendor can reiterate and make changes.

More recently developers of VRU algorithms have utilized graphical development environments. Such graphical development environments use icons to represent various call flow components with lines or arrows connecting these icons to indicate the call flow. One such graphical development environment is disclosed in U.S. patent application Ser. No. 08/599,134, entitled "ENHANCED GRAPHICAL DEVELOPMENT ENVIRONMENT FOR CONTROLLING PROGRAM FLOW," having a common assignee, incorporated herein by reference.

Although the use of graphical development environments aid the consumer in understanding the call flow by depicting it in graphical terms, the generated diagrams are merely supplemental to the detailed specification. The specification must still be reviewed by the various consumers, as some of its information does not appear in the graphical representation. Furthermore, the detail of the dialogue is still present with all its variables and branches. There remains complexity inherent in this detail that cannot be simplified merely by presenting it in graphical form.

Additionally, these graphical development environments are designed to aid in the understanding of the detailed specification and for the subsequent coding of the VRU algorithm after information regarding the entity's application of the VRU has been gathered in the interview process. The complexity of such environments typically do not lend themselves to their utilization in the initial interview process to aid in the first iteration of development of the VRU dialogue.

Moreover, the complexity included in such graphical development environments limits their use in navigation in the detailed specification. Although, the call flow is presented graphically, there is considerable detail included. Therefore, the graphical development environment does not present an easily comprehensible representation of the call flow from which a consumer may readily identify an area of interest within the specification or VRU application.

Furthermore, the use of graphical development environments does nothing to address the problems associated with differences in reviewing VRU dialogue from written word rather than spoken dialogue.

Therefore, a need in the art exists for a VRU dialogue development tool which presents VRU specifications in a format readily understandable by the various consumers which must review the specification.

There is a further need in the art for a VRU dialogue development tool capable of presenting a sample of VRU dialogue in an audio format, prior to completion of VRU programming.

There is a still further need in the art for a VRU dialogue development tool capable of producing specification documents directed to individual consumers charged with responsibility to review individual aspects of the VRU specifications.

There is yet a further need in the art for a VRU dialogue development tool suitable for use in the initial specification interview process.

There is a need in the art for a VRU dialogue development tool which provides a readily comprehensible overview of a VRU dialogue. Additionally, there is a need in the art for a VRU dialogue development tool which provides navigation between this readily comprehensible overview of a VRU dialogue and a detailed representation of the VRU application implementing that dialogue.

SUMMARY OF THE INVENTION

The above and other needs are met by a system and method for developing a VRU dialogue in which a prototyping tool is utilized in the VRU dialogue specification interview process. The prototyping tool provides a platform, by assembling various information into a prototype or summary of the call flow, upon which a VRU application may be later developed with the use of a graphical development environment or other VRU development tool. This summary is adapted to present various aspects of the call flow to consumers for their review. Additionally, the summary may be utilized as a framework around which the VRU application is to be formed.

The term "prototype" is used in the above context to include a sample of the VRU dialogue with its associated call flow created through the interview process. However, it shall be appreciated that the prototype or call flow summary as discussed herein is not itself a functional VRU algorithm.

The prototyping tool includes a simplified user interface consistent with its task of presenting a summary of a call flow rather than a detailed specification. In the prototyping tool, for example, the number of icons, representing the various components of the call flow to be diagramed, are few. Because detail as to what specific information is to be gathered at a particular point or what interaction is required with a host processor is not included in the prototype, generic icons such as "ask," to indicate user input, "tell," to indicate VRU output, and "scenario," indicating a point at which variable information may cause a branching of call flow are utilized to conceptualize the call flow in the prototype.

A technical advantage of the use of simplified concepts, represented by the above mentioned icons, is that the prototyping tool may be utilized in the initial specification interview process. Because precise detail as to how particular functions are accomplished may be ignored initially, the prototyping tool provides a suitable medium for utilization at a very early point in the specification process.

A further technical advantage of the use of simplified concepts is that a summary of the call flow, rather than a detailed specification of the VRU algorithm, is created. Presentation of this summary is possible both in a graphical representation created by the interconnection of the prototyping icons, as well as a textual representation generated by the prototyping tool from the input information.

Associated with the prototyping tool icons are forms for inputting information with respect to the context of any icon in a particular VRU dialogue. These forms provide for the input of such information as messages and comments associated with the call flow at the point at which the icon appears. Although messages in the final VRU algorithm will sometimes involve certain static phrases or information composited with variable information, perhaps provided by interaction with a host processor, the messages input to forms associated with the prototyping tool icons do not reference variables, instead example values are defined, which may be conveyed at the particular point in the call flow.

Accordingly, another technical advantage of the use of such example values, representing a complete phrase or information packet exemplary of a transaction at the associated point in the call flow, is that it allows for the auditory review of the call flow at a very early stage of the specification interview process. Such an auditory review may even occur before the source and method for acquisition of the variable information involved is determined, and certainly long before coding of a VRU application is complete.

A further technical advantage of the summary of the call flow created by the prototyping tool is that generation of reports containing only information with respect to a particular consumer's needs is possible. For example, a report including only the verbiage to be spoken may be generated by simply out-putting the speech information previously input. It shall be appreciated that such a report is very difficult if not impossible in the prior art, as its generation would require assembling static phrases, such as "Your balance is," with contextual phrases, such as "9.50," which exist in the prior art specification only as variables, to create much of the verbiage to be spoken.

A further technical advantage of the summary of the call flow created by the prototype tool is that it may be utilized to create an equivalent call flow framework in the VRU programming environment.

The icons and forms of the prototyping tool are linked to corresponding icons and forms within the graphical development environment or other development environment. Therefore, a developer of the VRU application may directly use the framework created by the prototyping tool in the graphical development environment. Furthermore, a technical advantage is realized by this linking as any subsequent modifications to either the call flow summary/prototype or the VRU application may be easily projected to the other representation through these links. As such, modification of the VRU application is simplified because the summary may be used to indicate changes necessary in the VRU application itself. Additionally, synchronization of the summary and VRU application, with respect to modifications, is simplified by their association through the links.

Moreover, a programmer may readily identify an area in the VRU application in which he is interested by locating a point in the call flow as represented by the summary/prototype and utilize the link. The aforementioned links provide a convenient means by which the programmer may easily view a detail or overview of the VRU application. Likewise, such VRU application navigation may be equally useful for any other consumer. For example, one not familiar with the call flow, may easily navigate through the prototype until identifying an area of interest. Thereafter, the link may be utilized to retrieve and review associated forms.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
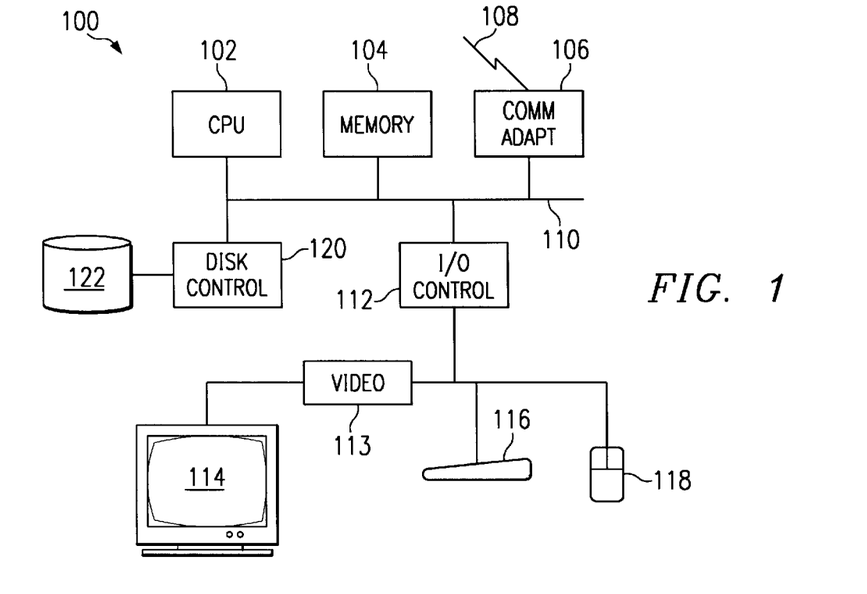
FIG. 1 illustrates a computer system adapted to execute the prototyping tool of the present invention.

FIG. 1 illustrates a personal computer system (PC) 100 adapted to execute a graphical development environment and the prototyping tool of the present invention. Illustrated are a central processing unit (CPU) 102 coupled via bus 110 to memory 104, communications adapter 106, disk controller 120 and input/output (I/O) controller 112. Disk controller 120 is coupled to storage device 122 and communications adapter 106 is coupled to network 108. I/O controller 112, in turn, is coupled to video controller 113, keyboard 116, and pointing device 118. Video controller 113 is coupled to display device 114.

As is well known in the computer art, CPU 102 executes programs residing in storage device 122 and/or memory 104. The programs utilize video controller 113 to display results on display device 114. A user or developer inputs commands into PC 100 via keyboard 116 and/or pointing device 118.

A preferred embodiment of a graphical development environment operable on PC 100 as discussed herein is the InVision™ application development tool. The InVision™ manual, document number 60.02.27 available from the Technical Documentation Department, InterVoice, Inc., 17811 Waterview Parkway, Dallas, Tex. 75252, is incorporated by reference herein.

The prototyping tool of the present invention is preferably utilized in conjunction with a graphical development environment, such as the aforementioned InVision™ application development tool, operable on PC 100. However, it shall be understood that the prototyping tool may be utilized alone and still provide the advantages of presenting a summary of call flow. Preferably, a specification analyst, or similar representative of the VRU application vendor/supplier, utilizes the present invention on PC 100 while interviewing specification agents of the entity desirous of a VRU application.

Figure 2:
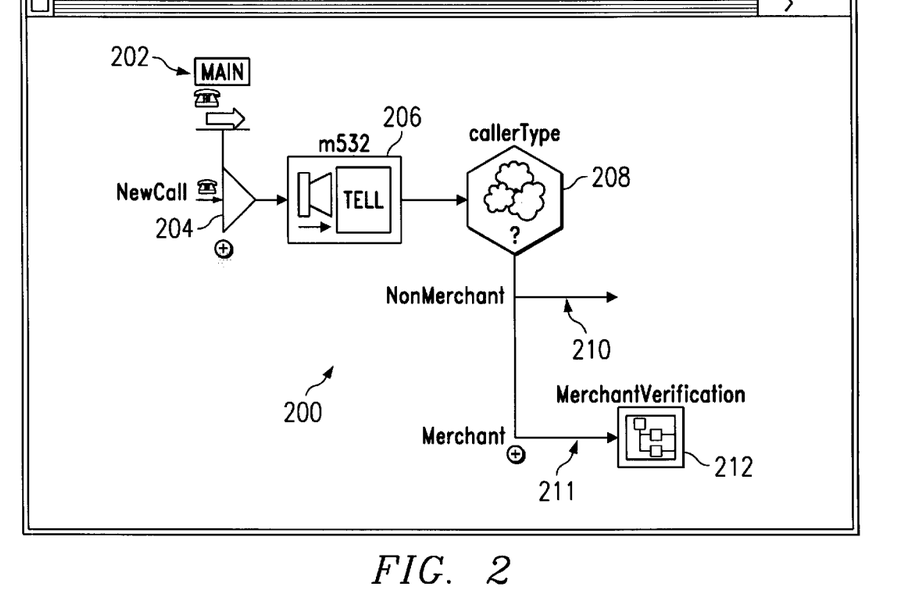
FIG. 2 illustrates an embodiment of a screen presented to the user when designing a call flow summary.

FIG. 2 illustrates a screen which may be presented by the prototyping tool of the present invention. It can be seen that a portion of a VRU dialogue is represented in summary form as flow diagram 200. Call flow is in part illustrated by new call icon 204 connected to tell icon 206 which is in turn connected to scenario icon 208.

Scenario icon 208 represents a point where the conversation might be different, or branch, depending on different events or information. Here scenario icon 208 represents identification of caller type. It shall be appreciated that, although the existence of a variable is recognized, specifics as to what the variable is, where it is sourced, or how possible errors associated with its input or output are trapped are not incorporated into this flow diagram. Instead, scenario icon 208, having been provided initially by the prototyping tool as a generic scenario, is labeled with the type of information with which the scenario is concerned along with the various options that could occur. Here scenario icon 208 leads to branches 210 and 211. In turn, branch 211 leads to sub-function icon 212.

Flow diagram 200 presents a concise graphical summary of a VRU dialogue which is easy to review and comprehend. It shall be appreciated that the simplicity of the summary generated by the prototyping tool makes it ideal for use by a specification analyst while interviewing the specification agents.

Because the prototyping tool is utilized to initially construct only a summary of a VRU dialogue, the employment of a user interface simpler than that of a typical graphical development environment is possible. Although graphical development environments present a very intuitive means by which to develop a detailed graphical representation of a call flow, along with its associated variables and host interactions, it is this ability to present such detail that dictates a floor to its simplicity. Whereas, in the prototyping tool of the present invention, a considerable amount of the VRU application details are not yet considered upon its utilization.

In the prototyping tool, for example, the number of icons, required to represent the various components of the call flow to be diagramed, are few. This is because detail as to what specific information is to be gathered at a particular point or what interaction is required with a host processor is not required to be included in the prototype. Therefore, general icons such as "ask," to indicate user input, "tell," to indicate VRU output, "scenario," indicating a branch point in the conversation, and "menu," to indicate a list of user selectable options, are utilized to conceptualize aspects of the call flow in the prototype.

Likewise, information to be associated with icons of the prototyping tool is simplified. Rather than precise detail as to variables to be used, their form, and how particular functions are accomplished, the prototyping tool provides a simple form allowing the input of such information as description of the function, an example of verbiage to be spoken, the number of call flow branches out if applicable, and any comments the specification analysis feels might be helpful in understanding the function desired at this particular point in the call flow.

As a result of presenting a simple user interface utilizing simplified concepts, represented by the above mentioned icons and their associated information, the prototyping tool may be utilized by the specification analyst concurrent with interviewing the specification agent. In a typical paradigm the specification agent simply provides the specification analyst with the various conversations that the VRU dialogue should provide, indicating both the call flow and substantive language of the conversation.

The prototyping tool allows the specification agent to specify a VRU application by describing all the possible conversations that could occur. The specification analyst assembles the various icons of the prototyping tool into a call flow summary based on this information.

Preferably, the call flow summary is developed by the specification analyst selecting the proper icon from an icon palette available in the prototyping tool, such as by using keyboard 116 or pointing device 118, and placing it at the proper place to create the desired call flow. Thereafter, the specification analyst selects the icon's associated form, such as by clicking on the icon with pointing device 118. A form is then presented into which the specification analyst can input information.

For example, the specification agent might say "I want to offer non-merchant customers a menu at this point, and I want it to have options for account information, funds transfer, contacting a customer service representative, and ending the call." From this information, the specification analyst would use the prototyping tool to add a menu at the designated point in the call flow of the VRU dialogue, such as illustrated by branch 210 in FIG. 2. The specification analyst would also open the form associated with the menu icon and add the other information provided by the specification agent such as a description of the menu, the number of options, and an example of verbiage to be spoken for each option, along with any comments the specification analysis feels might be helpful in understanding the function desired at this particular point in the call flow.

Figure 3:
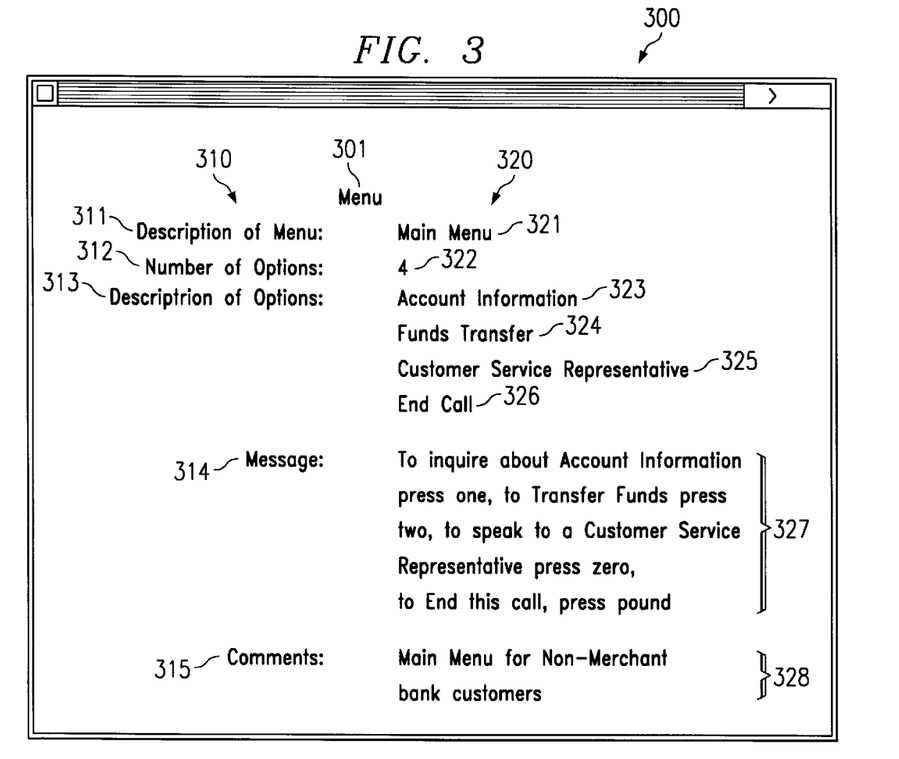
FIG. 3 illustrates an embodiment of a form associated with the menu icon of the prototyping tool of the present invention.

FIG. 3 illustrates a preferred embodiment of a form associated with a menu icon as form 300. Item 301 identifies form 300 as being associated with a menu icon of the prototyping tool. The items in column 310, items 311–315, are provided by the form, and identify information to be input into the form. The items in column 320, items 321–328, are information input by the specification analyst. It shall be appreciated that items 321–328 all consist of information discernable from the specification agent's comment above.

It shall be understood that some information in column 320 of form 300 may be automatically presented within form 300 by the prototyping tool based on other information provided by the specification analyst. For example, item 322 indicating the number of options available in this menu may cause the proper number of spaces associated with item 313, "Description of Options," to become available in form 300. Furthermore, items 323–326 may be automatically assembled by the prototyping tool into the message of item 327. However, it shall be understood that even with the prototyping tool providing certain information in form 300, all such information is available for editing by the specification analyst. For example, because item 324 is identified as "Funds Transfer," its automatic placement into a message might result in "to funds transfer press two" rather than the desired message "to transfer funds press two." Therefore it is desirable to allow the editing of information automatically presented by the prototyping tool.

It shall be understood that the message, as included in forms of the present invention, is a specific example of a conversation that may occur at the point in the call flow represented by a particular icon. Therefore, even where a variable will be spoken in conjunction with a standardized static phrase, the message included in the form will be a complete message indicative of the compilation. For example, in the completed VRU application selection of the "Account Information" menu option may result in a static message of "Your current balance is" spoken in conjunction with a spoken variable indicating the current balance. However, in a form associated with the tell icon representing selection of the "Account Information" menu option, the message input by the specification analyst might be "Your current balance is $100.35."

It shall be understood that forms associated with different icons of the prototyping tool of the present invention are adapted to gather information relevant to the icon with which the form is associated. For example, form 400 illustrated in FIG. 4 associated with scenario icon 208 includes items found in other forms, such as identification of the icon it is associated with, item 401, description, item 411, and comments, item 414. However, other items found in other forms, such as form 300 illustrated in FIG. 3, are not included in form 400.

Figure 4:
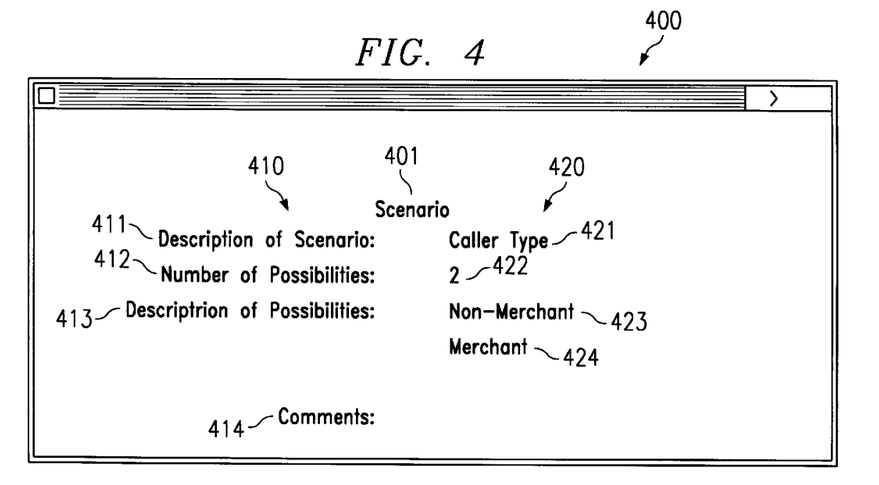
FIG. 4 illustrates an embodiment of a form associated with the scenario icon of the prototyping tool of the present invention.

It shall be appreciated that although the form associated with the scenario icon includes items to indicate various possibilities of call flow branching, there is no necessity that the source of variables indicating the existence of these possibilities be input. This allows the recognition of the existence of different scenarios in the call flow without a determination of the mechanics of its handling by the VRU. This is advantageous at the interview stage of the VRU development process as often times this information is not known or, even if it is known, the mechanics of sourcing and handling the information is not necessary to develop a call flow summary. However, it shall be understood that if such information is available at the initial interview, it may be included in form 400 within the comments.

It shall be understood that the forms utilized by the present invention are not limited to inclusion of the information illustrated in the figures. Any information useful to the development of the VRU summary of the prototyping tool may be included in the forms associated with the icons. Furthermore, the forms may be in any format determined to present the information in a useful fashion and are expressly not limited to the columnar format illustrated.

Figure 5:
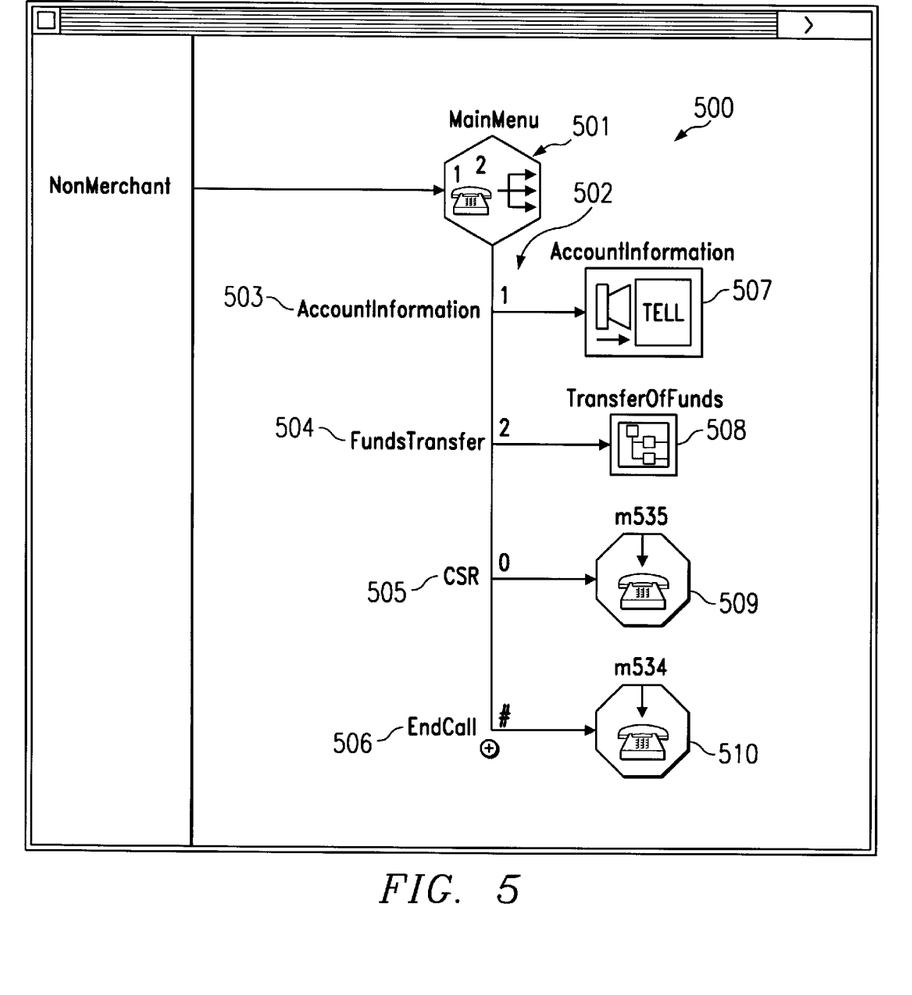
FIG. 5 illustrates an embodiment of a view associated with the menu icon of the prototyping tool of the present invention.

In addition to forms, the icons of the prototyping tool may also have a view of their function associated with them. FIG. 5 illustrates view 500 which is a graphical representation of the function of the above described menu icon inserted by the specification analyst at branch 210, shown here as menu icon 501. Because this is a menu, which by definition requires caller input, reference to selection input is automatically included as indicated by items in column 502. Of course, the automatic inclusion of such items may be omitted, if desired.

View 500 also includes option branches, items 503–506, as indicated by information input into form 300 associated with menu icon 501. Of course functions within a view, such as the aforementioned branches, may be initially input in the view rather than an associated form, if desired. For example, rather than inputting the number "4" within form 300 illustrated in FIG. 3, the operator may simply indicate the existence of 4 branches graphically in the view. Thereafter this information may be automatically input in the proper space of an associated form by the prototyping tool.

The branches illustrated in the view symbolize the call flow and are adapted for inclusion of prototyping tool icons, just as in the call flow summary. For example, item 507 illustrates a tell icon connected to account information branch 503. Likewise, item 508 illustrates transfer of funds sub-function icon 508 connected to funds transfer branch 504. As above, the placing of such icons on the various branches of a view may be utilized by the prototyping tool to include or update information within an associated form.

Of course, the various sub-function icons may be displayed in the call flow summary, in addition to their display in the view of the icon as described above. For example, a display option may be selected to allow the viewing of a simplified call flow summary in which only the highest level icons are displayed or the viewing of all icons, including sub-functions icons.

It shall be appreciated that upon completion of an interview by interconnecting the various icons and inputting information in their associated forms utilizing the prototyping tool of the present invention that a complete dialogue exists for the call flow of the VRU application. In a preferred embodiment the various messages along any call path may be audibly played by the prototyping tool out-putting the messages in proper order to a text to speech device well known in the art. Such text to speech devices are capable of playing the messages input into the various forms of the call flow summary with both the pace and inflection that will be found in the resulting VRU application, although generally not with the same quality as the actual voice. This allows review of the actual dialogue as it will be presented by the VRU, to verify its suitability.

By audibly playing the dialogue of the call flow at such an early stage in the VRU development process not only are undesirable aspects easily detected, but any changes desired may be readily made. For example, if it is determined upon listening to the dialogue that a particular message should be played prior to another message, this may be accomplished by simply rearranging icons within the prototyping tool. In the prior art, where the VRU application must be coded in order to include spoken variables, such early audible review is not possible and, therefore, results in much more difficult code modification to effectuate a similar change.

The call flow summary developed by the prototyping tool includes sufficient information to allow the generation of reports directed to particular consumers of the prior art specification document. For example, the printing of the call flow summary with or without the various views of the prototyping icons provides a report suitable for review by a project manager or similar consumer. Similarly, as the forms of the prototyping tool include the dialogue of the call flow, a report including only this dialogue may be output for review by such consumers as a legal or marketing department.

Although the generation of reports tailored for specific consumers of the reports is discussed above, it shall be understood that reports including a composite of the information included in the call flow summary may also be generated, such as, for example, a flow chart suitable for use by a developer of the VRU application. Additionally, these reports may be in a form similar to the prior art specification including technical aspects in cryptic fashion.

To further aid in the development of the VRU application, specific portions of the prototyping tool are linked to specific portions of the graphical development environment used to develop the VRU application. For example, icons used in the prototype tool may be linked to particular icons used in the graphical development environment. Likewise, forms of the prototyping tool may be linked to forms in the graphical development environment. Initially this provides an advantage in the fact that simply creating the call flow summary also creates a framework, or flow chart, within the graphical development tool by the resulting interrelationship. An additional advantage is that information provided in the prototype, such as message text may be input into the prototype form, is transferred to the linked portion of the development environment. Therefore coding of the VRU application from this framework involves the simplified task of including additional detail such as variables and host interaction within the already defined framework.

Additionally, the linking of the prototype and the VRU application aids in subsequent modification of that VRU application. Through the links it is possible to locate areas of interest within the VRU application by reviewing the call flow summary. Thereafter, a linked portion of the VRU application may be reviewed or edited as needed. Similarly, changes may be indicated on the call flow summary which may then be projected onto the actual VRU application through the use of the links. Similarly, any changes necessitated in the development of the VRU application may be easily reflected in the call flow summary through these links. Therefore, it becomes a very simple task to keep the actual VRU application and its associated call flow summary synchronized, should any subsequent need for change arise. Such a system provides the developer with means for easy navigation between the two representations, which is easily updated upon either's revision.

Utilization of links between the summary and detailed program is especially helpful when working with lay persons not familiar with the specifics of the VRU application. These lay persons may refer to the call flow summary to indicate areas of interest or changes desired, while still enabling the developer to locate the portions of code requiring attention or modification.

In a preferred embodiment, the linking of the prototyping tool and the graphical development environment is initially accomplished automatically during the creation of the call flow framework or flow chart within the graphical development tool. Preferably links are between one prototype icon and the first icon of the related set of one or more VRU application icon. The existence of such links may be graphically displayed, such as by a link indication appended to a linked icon and/or linked form (not shown). For example, upon establishing a link between an icon of the prototyping tool, and an icon of the graphical development environment, a unique graphical symbol may be added to both icons to signify the existence of a link. Of course, links between the prototyping tool and graphical development environment may be modified or deleted as desired.

It can be seen that from a review of a call flow summary and any associated views a readily understandable and complete picture of call flow is presented by the prototyping tool of the present invention. Furthermore, as this information is assembled by the prototyping tool prior to the making of many determinations, such as source and form of variables and mechanics of host interaction, this complete picture is presentable to the entity desirous of a VRU application substantially simultaneous with an initial interview. Therefore, in addition to presenting information easily understandable by the consumers of the product, initial revision iteration of the development of the VRU application is shortened. Likewise, through the use of the aforementioned links, subsequent changes to the VRU application are simplified through navigation between the call flow summary and VRU application.

Although the present invention and its advantages have been described in detail, it should be understood that various changes, substitutions and alterations can be made herein without departing from the spirit and scope of the invention as defined by the appended claims.

What is claimed is:

1. A computer program product having a computer readable medium on which computer program logic is recorded for developing a VRU application, said computer program product comprising:
   a computer readable storage medium;
   a computer program stored in said storage medium comprising:
      means for graphically representing a call flow summary as a plurality of icons; and
      means for inputting information associated with particular icons of said plurality of icons, said information comprising specific examples of a VRU dialogue associated with said call flow summary at particular icons of said plurality of icons.

2. The computer program product set forth in claim 1, further comprising:
   means for outputting said specific examples substantially exclusive of other information.

3. The computer program product set forth in claim 2, wherein said outputting means operates to output said specific examples audibly.

4. The computer program product set forth in claim 2, wherein said outputting means operates substantially contemporaneously with said inputting means.

5. The computer program product set forth in claim 1, further comprising:
   means for generating a flow chart from said call flow summary, said flow chart being suitable for use in developing a VRU application conforming to said call flow summary.

6. The computer program product set forth in claim 5, wherein said generating means operates substantially automatically.

7. The computer program product set forth in claim 5 wherein said flow chart is output in human readable form.

8. The computer program product set forth in claim 5, wherein said flow chart is machine readable by a computer process utilized in developing a VRU application.

9. The computer program product set forth in claim 1, further comprising:
   means for cross referencing said call flow summary with a VRU application conforming to said call flow summary, wherein a cross reference is established by said cross referencing means, said cross reference identifying particular ones of said plurality of icons of said call flow summary with a portion of said VRU application.

10. A method for developing a VRU application in at least two steps, said method comprising the steps of:
   summarizing a call flow, said summarizing step comprising the substeps of:
      graphically representing a call flow summary as a plurality of summary icons representing call flow functions connected by at least one line on a display means; and
      inputting call flow summary information associated with ones of said plurality of summary icons, said summary information comprising representative messages of a dialogue to be provided by said VRU application; and
   detailing said call flow, said detailing step comprising utilization of said call flow summary information in conjunction with additional information associated with said VRU application to result in a call flow detail.

11. The method set forth in claim 10, wherein said summarizing step further comprises the substep of:

outputting ones of said representative messages, said outputting step audibly presenting said ones of said representative messages in an order determined by said call flow summary.

12. The method set forth in claim 11, wherein said outputting substep operates substantially contemporaneously with said inputting step.

13. The method set forth in claim 10, wherein said summarizing step further comprises the substep of:

outputting said representative messages in a textual report containing substantially only said representative messages.

14. The method set forth in claim 10, wherein said detailing step further comprises the substep of:

graphically representing said detailed call flow as a plurality of detail icons representing detailed call flow functions connected by at least one line on the display means, said graphical representation of said detailed call flow being generated at least in part by said call flow summary.

15. The method set forth in claim 14, wherein said detailing step comprises at least one first form associated with a summary icon of said plurality of summary icons, said at least one first form corresponding to a second form associated with said detailed call flow representation.

16. The method set forth in claim 10, further comprising the step of:

generating a flow chart from said call flow summary, said flow chart being suitable for use in developing a VRU application conforming to said call flow summary.

17. The method set forth in claim 16, wherein said flow chart is generated exclusively from information input in said summarizing step.

18. The method set forth in claim 16, wherein said generating step comprises the substep of outputting said flow chart in human readable form.

19. The method set forth in claim 16, wherein said flow chart is machine readable by a computer process operable to accomplish said detailing step.

20. The method set forth in claim 10, further comprising the step of:

cross referencing said call flow summary with a VRU application conforming to said call flow summary, wherein a cross reference is established by said cross referencing identifying a particular portion of said call flow summary with a particular portion of said VRU application.

21. The method set forth in claim 20 wherein said cross referencing step is performed substantially automatically in conjunction with performing said detailing step.

22. The method set forth in claim 20, wherein said cross referencing of said call flow summary and said VRU application is updated upon a change to either said call flow summary or said VRU application.

23. A system for developing an automated information interaction algorithm, said system comprising:

means for graphically representing an initial summary of said interaction algorithm as a plurality of concept icons representing interaction algorithm concepts graphically connected on a display means; and means for inputting interaction algorithm concept information associated with ones of said plurality of concept icons, said interaction algorithm concept information comprising a plurality of example messages to be presented by said interaction algorithm at particular points in said interaction algorithm represented by said plurality of concept icons.

24. The system set forth in claim 23, further comprising:

means for outputting ones of said plurality of example messages means audibly in an order determined by said algorithm summary.

25. The system set forth in claim 24, wherein said outputting means operates substantially contemporaneously with said inputting means.

26. The system set forth in claim 23, further comprising:

means for outputting ones of said plurality of example messages in a textual report containing substantially only said plurality of example messages.

27. The system set forth in claim 23, further comprising:

means for graphically representing said algorithm as a plurality of detail icons representing detailed algorithm functions graphically connected on the display means, said graphical representation of said algorithm being generated at least in part by said algorithm summary.

28. The system set forth in claim 27, further comprising:

means for linking said graphical representation of said algorithm and said graphical representation of said algorithm summary, wherein a link between said graphical representation of said algorithm and said graphical representation of said algorithm summary is established by said linking means providing a reference between particular portions of said graphical representations.

29. The system set forth in claim 28 wherein said link is established substantially automatically upon generation of said graphical representation of said algorithm.

30. The system set forth in claim 28, wherein said link is updated upon revision of either said graphical representation.

31. The system set forth in claim 27, wherein said inputting means comprises at least one first form associated with a concept icon of said plurality of concept icons, said at least one first form corresponding to a second form associated with said means for representing said algorithm as a plurality of detail icons.

32. The system set forth in claim 23, wherein ones of said plurality of concept icons include a view suitable for graphical representation by said representing means associated therewith, said view comprising at least a portion of said concept information associated with said one of said plurality of concept icons.

33. The system set forth in claim 32, wherein said view comprises a representation of functionality of a particular concept icon it is associated with.

34. The system set forth in claim 33, wherein said concept information associated with said particular concept icon of said plurality of concept icons is operable to change said view associated therewith.

35. A system for linking an algorithm and a summary of said algorithm, said system comprising:

first means for graphically representing said summary of said algorithm as a plurality of summary icons having a plurality of summary forms associated therewith;

second means for graphically representing said algorithm as a plurality of detail icons distinct from said summary icons, said plurality of detail icons having a plurality of detail forms associated therewith; and means for correlating ones of said plurality of summary icons with ones of said detail icons.

36. The system set forth in claim 35, wherein said correlating means comprises correlating each summary form of said plurality of summary forms to at least one detail form of said plurality of detail forms.

37. The system set forth in claim 35, wherein the representation of said algorithm graphically represented by said second means is generated at least in part by said summary of said algorithm graphically represented by said first means.

38. The system set forth in claim 35, wherein ones of said plurality of summary icons include a graphical indication of correlation to a detail icon of said plurality of detail icons.

39. The system set forth in claim 35, wherein ones of said plurality of detail icons include a graphical indication of correlation to a summary icon of said plurality of summary icons.

40. A system for developing an automated information interaction algorithm, said system comprising:

means for graphically representing an initial summary of said algorithm as a plurality of concept icons representing a plurality of algorithm concepts connected on a display means;

means for inputting algorithm concept information associated with ones of said plurality of concept icons, said algorithm concept information comprising a plurality of example messages to be presented by said algorithm at particular points in said algorithm represented by particular concept icons of said plurality of concept icons;

means for outputting ones of said plurality of example messages substantially contemporaneously with input of said concept information, said outputting means audibly presenting said ones of said plurality of example messages in an order determined by said algorithm summary;

means for graphically representing said algorithm as a plurality of detail icons representing detailed algorithm functions connected on the display means, wherein a graphical representation of said algorithm represented by said means for representing said algorithm is generated at least in part by said algorithm summary; and means for linking said algorithm summary and said algorithm.

41. The system set forth in claim 40, wherein said inputting means comprises at least one first form associated with a concept icon of said plurality of concept icons.

42. The system set forth in claim 40, wherein said linking means comprises said at least one first form corresponding to a second form associated with said algorithm.

43. The system set forth in claim 40, wherein ones of said plurality of concept icons comprise a graphical illustration associated therewith, each said graphical illustration illustrating a function of said algorithm concept associated therewith.

44. The system set forth in claim 43, wherein ones of said graphical illustrations comprise at least a portion of said concept information associated with said one of said plurality of concept icons.

45. The system set forth in claim 44, wherein said concept information is operable to alter ones of said graphical illustrations.

46. A method for prototyping a VRU dialogue comprising the steps of:

selecting particular icons from a palette of call flow icons;

inputting modular units of sample substantive language associated with ones of said particular icons;

inputting call flow information associated with said particular icons wherein connections are formed between said icons, thereby composing at least a portion of the call flow summary.

47. The method of claim 46 further comprising the step of outputting information comprising said modular units of sample substantive language according to the logic contained in said call flow information.

48. The method of claim 46 further comprising the step of adjusting the call flow by relocating said modular units of sample substantive language within the call flow.

49. The method of claim 47 wherein said step of outputting consists of one or more steps selected from the group consisting of:

printing, speaking, and transmitting via electrical communication lines.

50. The method of claim 48 wherein said sample substantive language comprises text phrases or numbers or both text phrases and numbers.

* * * * *